E. P. CADY.
Harvester Dropper.
No. 102,914.            Patented May 10, 1870.
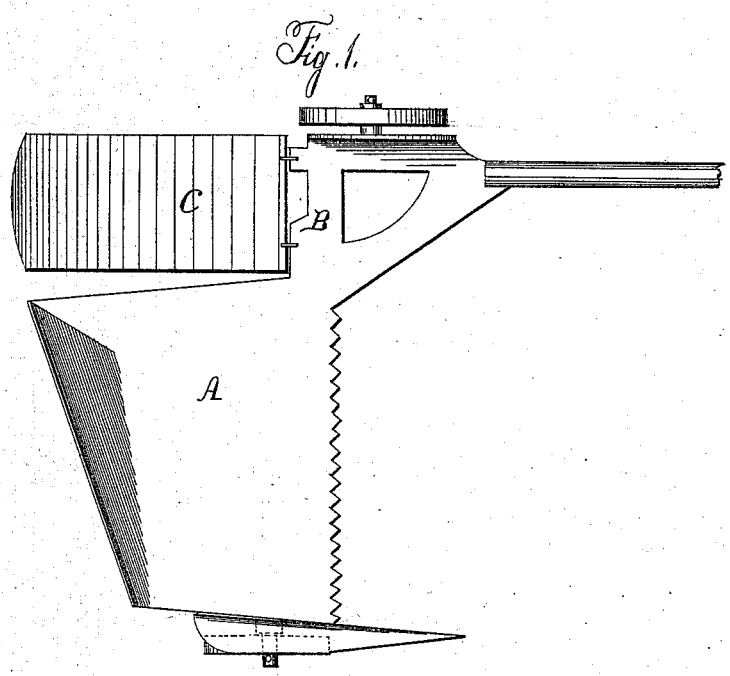

United States Patent Office.

EDSON P. CADY, OF TRENTON, WISCONSIN.

Letters Patent No. 102,914, dated May 10, 1870.

IMPROVEMENT IN DROPPING-PLATFORM FOR HARVESTERS.

The Schedule referred to in these Letters Patent and making part of the same

*To all whom it may concern:*

Be it known that I, EDSON P. CADY, of Trenton, in the county of Dodge and State of Wisconsin, have invented a new and useful Improvement in Harvesters; and I do hereby declare that the following is a full, clear, and exact description thereof, which will enable others skilled in the art to make and use the same, reference being had to the accompanying drawing forming part of this specification.

This invention relates to a new and useful improvement in droppers for harvesters; and It consists in the arrangement and connection of the apron or delivery-plate with the platform of the reaper, as hereinafter specified.

The accompanying drawing represents an outline top or plan view of a reaping-machine, with my delivery-plate attached.

Similar letters of reference indicate corresponding parts.

A is the platform of the reaper.

B represents an extension of the sickle-bar, to which my delivery-plate is attached.

C is the delivery-plate. This plate is made of sheet metal, or of any suitable material, and is hinged or attached to the extension portion of the sickle-bar in any manner, so that its outer end will hang loosely and drag on the stubble, and leave the cut grain in proper position on the ground.

This improvement is adapted to all reaping-machines which deliver the grain from the side of the platform.

In building new machines with the improvement, or in attaching the improvement to old machines, the platform is cut off where the cut of the sickle terminates.

In attaching the delivery-plate to the common reaper, a rod may be extended from the platform for attaching it.

In raking heavy grain from the platform of the ordinary harvesting-machine, the heads pitch into the stubble so near the platform of the reaper that the butts are carried round by the motion of the machine, which necessarily leaves the grain in bad condition for binding.

The grain is much scattered, and the butts are in a very uneven condition on the ground, making it extremely hard work for the raker to place it in proper position.

By my improvement the grain strikes the plate, and slides from it in as good position for binding as it was when on the platform of the reaper.

This is a very simple and cheap arrangement, greatly lessening the labor of harvesting by adding materially to the perfect operation of the machine.

Having thus described my invention,

I claim as new and desire to secure by Letters Patent—

The plate C, hinged at one end to the extension B of the sickle-bar, and at the side of the platform A, its free end resting on the ground, so that it may deliver the grain, as set forth.

E. P. CADY.

Witnesses:
N. E. ALLEN,
C. B. BEEBE.